United States Patent Office

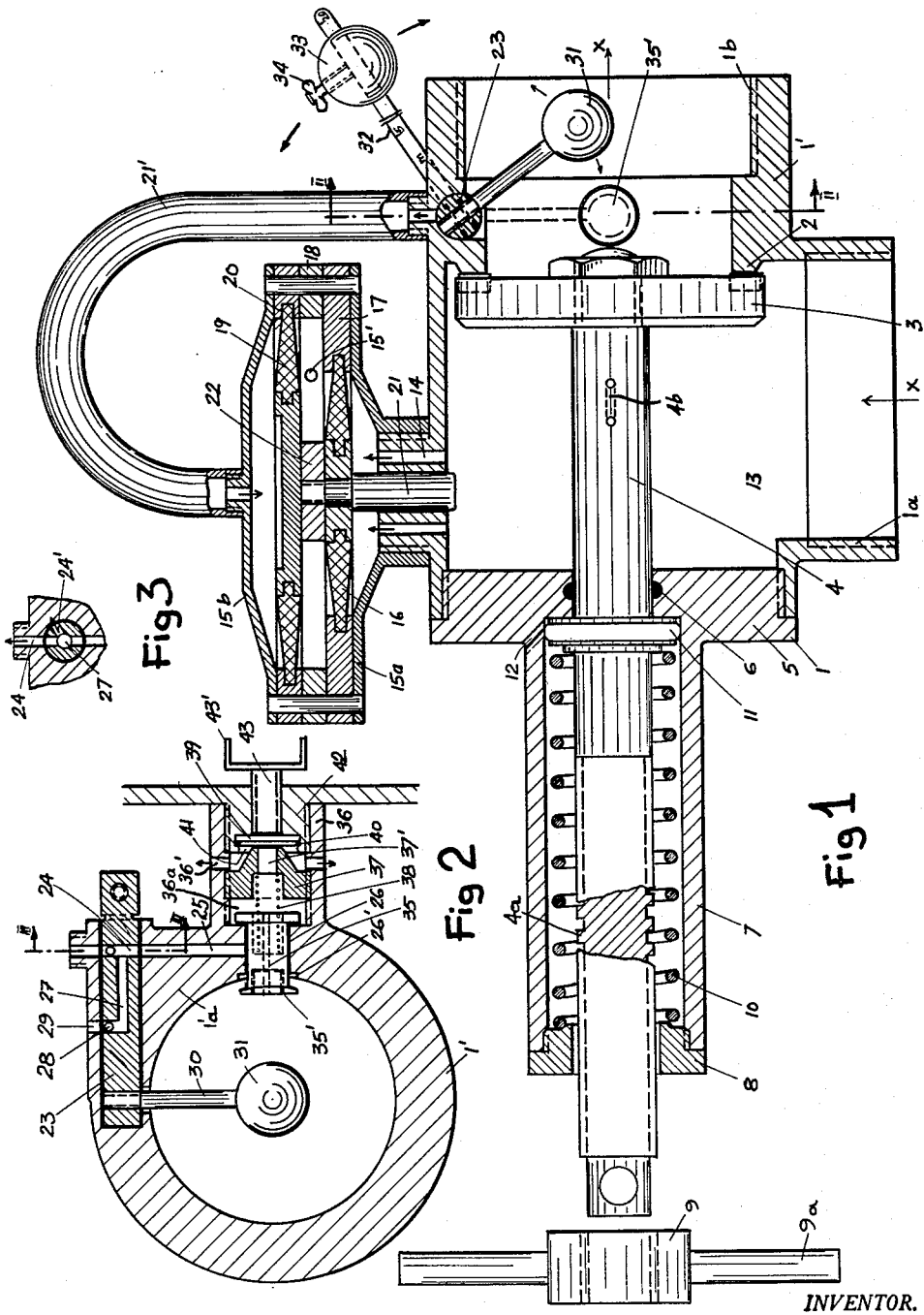

3,177,890
AUTOMATIC FLOW RATE RESPONSIVE SHUT-OFF VALVE
Peretz Rosenberg, Beit-Shearim, Israel
Filed Oct. 6, 1961, Ser. No. 143,423
7 Claims. (Cl. 137—460)

This invention relates to automatic shut-off valves for fluid lines used in industry or agriculture to permit the flow of a predetermined quantity of fluid or the flow of the fluid for a predetermined period of time.

It is the object of the present invention to provide a valve for fluid lines which will close automatically after a predetermined time or after a predetermined quantity of fluid has flowed through the line, or after a break has occurred in the line.

It is a further object of the invention to provide a valve which will close automatically if the rate of flow of the fluid flowing through it exceeds a certain predetermined maximum.

The invention is illustrated, by way of example only, in the accompanying drawings, in which:

FIG. 1 is a longitudinal section through the valve according to the invention.

FIG. 2 is a section thereof taken on line II—II of FIG. 1.

FIG. 3 is a section of a detail taken on line III—III of FIG. 2.

A valve housing 1 provided with threads 1a, 1b is adapted to be connected into a supply line in which fluid flows in the direction of arrows x—x. A shoulder 2 within housing 1 provides a seat for disc 3 attached to the inner end of a stem 4 movable in bonnet 5 in which an annular gasket 6 is lodged surrounding the stem 4. The outer end of bonnet 5 merges into a cylindrical elongated chamber 7 which is closed at its outer end by a screwed-in plug 8. The stem 4 extends through chamber 7 and out through plug 8 and is provided with a screw-thread 4a along the portion lying normally within the chamber 7 and extending out therefrom. A nut 9 integral with diametrically opposed handles 9a threads onto stem 4 and seat 2, and when turned opens the valve, against the pressure of a spring 10 housed in chamber 7, between plug 8 and a piston 11 which is integral with stem 4 and fits tightly but slidably in chamber 7. A narrow port 12 leads from the bottom of chamber 7 to the outside to permit air to enter the chamber when the stem is screwed outwardly lifting the disc off the seat and simultaneously the piston 11 from the bottom of chamber 7. A narrow channel 4b is so positioned in stem 4 that when the valve is being opened, i.e. when the disc 3 is approaching the bonnet, the channel bridges the gasket 6 and permits fluid from the valve chest 13 to enter into the chamber 7 between its bottom and the piston 11. Channel 4b is completely in channel 7 when the valve is fully opened. When the valve is being opened or is in the opened state, the atmospheric pressure is sufficient to prevent the liquid pressure within chamber 7 from forcing the liquid through the narrow passageway of port 12.

During the closing movement of the valve, channel 4b bridges once more gasket 6 at the beginning of the stroke and enters completely back into the valve chest 13. Piston 11 is now forcing the fluids in chamber 7 slowly out through port 12. The force applied by the piston to the liquid is of a sufficient magnitude to overcome the atmospheric pressure at port 12 which was previously (when the valve was in the open position) preventing the liquid from flowing out therefrom. Since port 12 is narrow, it restricts the rate of flow of the liquid from chamber 7 out to the atmosphere so that there is sufficient liquid within the chamber to restrain spring 10. This enables the valve disc 3 to return smoothly and slowly toward the valve seat 2 and to prevent shock thereby when the valve disc contacts the valve seat.

The valve chest 13 is in communication by means of two ports 14 with the interior of a housing whose bottom section 15a is screwed into the wall of the housing. The housing comprises in addition: a membrane 16 near ports 14 mounted in an annular member 17; an annular spacer 18; a membrane 19 larger in area than membrane 16 mounted in an annular member 20; and a top section 15b whose interior is in communication with the downstream part 4 of the valve through a pipe 21, as will be described hereinafter. The bottom section 15a, annular member 17, spacer 18, annular member 20, and top section 15b are held together at their periphery by bolts and nuts (not shown). An aperture 15' is made in the wall of the spacer 18 to open the space between membranes 16 and 19 to the atmosphere. A pin 21 adapted to slide in an aperture in the wall of the valve and to extend with its free end into the valve chest 13 is fixed to the membrane 16 by a nut 22 which is of the same thickness as spacer 18 and thus abuts membane 19.

The wall of the valve 1 on the downstream side 1' is enlarged over substantially 90° of its periphery at 1'a and houses a three-way cock 23 having a transverse bore 24 adapted to establish communication between pipe 21' and the downstream side 1' of the valve through a bore 25 in the wall 1'a and a bore 26 in the wall 1'. A radial bore 24' 45° removed from bore 24 but in the same plane, is provided in the cock and is in communication with an axial bore 27 leading from it and bore 24 to a radial bore 28 which lies at the same angle to bore 27 as bore 24'. A port 29 in wall 1'a establishes communication between bore 28 and the atmosphere in a certain predetermined angular position of cock 23. A rod 30 whose length is substantially equal to the radius of the downstream side 1' of the valve extends radially inward into the interior of this downstream side 1' and is attached by screwing near the inner end of cock 23. The rod 30 carries an integral spherical weight 31 at its end. A calibrated rod 32 which marks the rate of flow is attached to the free outer end of cock 23 making an angle of 90° with the extension of rod 30. A balance weight 33 is slidable along rod 32 and can be fixed thereon by means of a set-screw 34.

A plug 35 fits loosely into bore 26 so that there is the annular space surrounding the plug. The inner end of the plug has an enlarged head 35' which is adapted to fit into a counter bore 26' surrounding bore 26. The outside of wall 1' around bore 26 merges into an internally threaded sleeve 36 into which a bush 37 having an axial bore 37' is screwed, leaving a chamber 36a between the bush 37 and the bottom of the sleeve 36. A spring 38 lodged with one end in bush 37 and with the other in plug 35 urges the latter towards the interior of the valve, i.e. into the position where head 35' does not rest in counterbore 26'. A narrow bore, indicated in dotted lines extends through plug 35 and communicates between the interior of the valve and chamber 36a. A membrane 39 held by means of a split ring 40 in a central depression 41 of a plug 42 screwed into the end of sleeve 36, is adapted to close bore 37' of bush 37 when held against the latter by means of a screw 43 inserted in plug 42 and to prevent communication between bore 37' and two diametrically opposed apertures 36' in the wall of sleeve 36 which leads to the atmosphere. The screw 43 whose outer end may be provided with a handle 43' or any other suitable device may be turned automatically by the alarm mechanism of an alarm clock, by a wind screw or the like.

The operation of the valve above described is as follows: in the position shown in FIG. 1, the valve is closed, i.e. disc 3 sits on its seat 2, so that there is no fluid in the downstream side 1', i.e. the downstream part of the line is without pressure. The screw 43 is set to apply membrane 39 against bore 37'. The valve is now opened manually by screwing nut 9 onto the valve stem 4a against the pressure of spring 10 until valve disc 3 lies adjacent bonnet 5. This causes piston 11 to free port 12 so that the bottom of chamber 7 fills with air and then as channel 4b straddles gasket 6 fluid will flow into chamber 7 between its inner end and piston 11. As fluid fills the downstream side 1' of the valve it flows through bore 26, bore 25 of wall 1'a, bore 24 of cock 23 through pipe 21' into the top of housing 15b and acts on membrane 19, bore 24 being kept in the open position by the set balance weight 33 and rod 32. Although the fluid has simultaneously filled the bottom of the housing 15a through ports 14 and thus acts on the membrane 16, the pressure on membrane 19 owing to the larger size of the latter forces membranes 19 and 16 downwardly and thus the pin 21 into the valve chest 13. The nut 9 can now be removed from stem 4a without fear of the disc being forced onto its seat by spring 10, since the pin 21 lies now in the path of the disc 3 and will remain in this position as long as equal pressure is maintained in the upstream and downstream part of the valve. The fluid also fills the chamber 36a, through the narrow bore in plug 35 so that the fluid pressure in chamber 36a and the downstream side 1' is equal, the spring 38 being of such strength to keep the plug head 35' away from the counterbore 26', under these pressure conditions.

If there should now be a break in the line, causing a lessening of the downstream, or, in the case of a sprinkler irrigation system, one of the sprinklers is broken so that the rate of flow becomes greater than that for which the balance weight 33 is set, the upstream pressure will cause weight 31 and rod 30 to rotate cock 23 so that bore 24 comes out of alignment with pipe 21' and bore 25, and bore 24' comes into communication with pipe 21' and bore 27, 28 becomes open to the atmosphere through port 29. This causes the pressure on membrane 16 to lift the latter and with it pin 21, causing the fluid in housing part 15b to flow out through pipe 21' and cock 23 to the open. The pressure of spring 10 now closes disc 3 onto its seat 2, the closing movement being slowed down due to the piston 11 forcing the water in chamber 7 slowly out through port 12, whereby a water hammer and a knocking of disc 3 onto seat 2 is prevented.

When under normal working conditions and normal fluid flow the valve is set to close after a predetermined time the handle 43' of screw 43 is connected to a clockwork which will turn the screw 43 after a certain time lapse. The fluid pressure in bore 27 will lift membrane 39 off its seat so that the fluid can escape through bore 37' and apertures 36' to the open. Since the cross-sectional area of bore 37' is larger than the sum of cross-sectional area of the annular space between bore 26 and the plug 35, the pressure in chamber 36a becomes less and the fluid pressure in the downstream side overcomes the force of spring 38 and forces the head 35' onto counter bore 26' to substantially close bore 26 to the inflow of fluid from the downstream side. Since the pressure in bore 25 is now equal to that of chamber 36a, the fluid will flow out from housing section 15b, line 21', bores 24 and 25 through chamber 36a, bore 37' apertures 36' to the open, causing pin 21 to be moved by membrane 16 to free disc 3 so that the latter will close onto its seat in the manner as above described. The narrow bore in plug 35 is not able to increase the pressure in chamber 36a when bore 37' is open since the cross-section of the latter is much larger than that of the narrow bore.

It will be understood that the screw 43 can be operated by other devices connected to handle 43', such as a wind screw which would cause the closing of the valve if strong wind conditions prevail, or a fluid meter, which would cause the closing of the valve after a certain quantity of fluid has passed therethrough.

I claim:

1. A valve comprising a valve disc closing onto a valve seat in the direction of the fluid flow, two superposed membranes of different areas being enclosed in a housing mounted on the valve, the smaller membrane being in communication with the fluid pressure at the entrance (i.e. upstream) of the valve seat at all times, while the larger membrane is in communication with the fluid pressure at the exit (i.e. downstream) of the valve seat by means of a by-pass and a three-way cock in said downstream side, means being provided on the valve stem to open the valve manually against the fluid pressure and against the force of a spring surrounding the valve stem, and means being further provided in combination with the membranes and extending into the path of movement of the valve disc to engage the disc and maintain it in the open position against the action of said spring force as long as the pressure in the up-stream and down-stream sides of the valve seat is substantially equal, the actuation of said three-way cock being effected by means sensitive to the rate of flow fixedly attached to said cock, said last-mentioned means permitting the communication of the fluid pressure to the larger membrane when predetermined flow conditions prevail, while when the rate of flow exceeds the predetermined rate, said last-mentioned means causing the cock to close communication between the interior of the valve and the larger membrane and simultaneously to provide communication between the space above the larger membrane and the atmosphere, whereby the fluid pressure from above the larger membrane is released to the atmosphere.

2. A valve comprising a valve disc closing onto a valve seat in the direction of the fluid flow, two superposed membranes of different areas being enclosed in a housing mounted on the valve, the smaller membrane being in communication with the fluid pressure at the entrance (i.e. upstream) of the valve seat at all times, while the larger membrane is in communication with the fluid pressure at the exit (i.e. downstream) of the valve seat by means of a by-pass and a three-way cock in said downstream side, means being provided on the valve stem to open the valve manually against the fluid pressure and against the force of a spring surrounding the valve stem, a pin being connected to the smaller membrane and being adapted to extend into the path of movement of the valve disc to engage the disc and maintain it in the open position when substantially equal pressure is maintained in the upstream and downstream sides of the valve seat, means sensitive to the rate of flow disposed in the path of the fluid stream and fixedly attached to said cock, a predetermined balance weight rigidly connected to said cock, said last-mentioned means and said balance weight cooperating to maintain said cock in a position to provide communication between said by-pass and said downstream when the rate of flow of said fluid stream is at a predetermined rate, said last-mentioned means and said balance weight further cooperating to cause said cock to move another position and close the communication between said by-pass and said downstream and to interconnect the space above the larger membrane and the atmosphere when the rate of flow varies from said predetermined rate.

3. A valve comprising a valve stem with a valve disc mounted on one end thereof, said valve disc closing onto a valve seat in the direction of the fluid flow, two superposed membranes of different areas being enclosed in a housing mounted on the valve, the smaller membrane being in communication with the fluid pressure at the entrance (i.e. upstream) of the valve seat at all times, while the larger membrane is in communication with the fluid pressure at the exit (i.e. downstream) of the valve seat by means of a by-pass and a three-way cock in said downstream side, means being provided on the valve stem to open the valve manually against the fluid pressure and against the force of a spring surrounding the valve stem, a pin being connected to the smaller membrane and being adapted to extend into the path of movement of the valve disc to engage the disc and maintain it in the open position when substantially equal pressure is maintained in the upstream and downstream sides of the valve seat, means sensitive to the rate of flow disposed in the path of the fluid stream and fixedly attached to said cock, a predetermined balance weight rigidly connected to said cock, said last-mentioned means and said balance weight cooperating to maintain said cock in a position to provide communication between said by-pass and said downstream when the rate of flow of said fluid stream is at a predetermined rate, said last-mentioned means and said balance weight further cooperating to cause said cock to move to another position and close the communication between said by-pass and said downstream and to interconnect the space above the larger membrane and the atmosphere when the rate of flow varies from said predetermined rate.

4. A valve comprising a valve stem with a valve disc mounted on one end thereof, said valve disc closing onto a valve seat in the direction of the fluid flow, two superposed membranes of different areas being enclosed in a housing mounted on the valve, the smaller membrane being in communication with the fluid pressure at the entrance (i.e. upstream) of the valve seat at all times, while the larger membrane is in communication with the fluid pressure at the exit (i.e. downstream) of the valve seat by means of a by-pass and a three-way cock in said downstream side, manually operable means being provided on the valve stem to remove the disc from its seat against the force of a spring surrounding the end of the stem and being housed in an elongated chamber extending from the valve bonnet, a piston integral with the stem and fitting in said chamber being adapted to slide in the direction of the movement of the disc, a small port being provided in the wall of said chamber near the bonnet, a gasket in said bonnet surrounding the stem to prevent leakage of the fluid to the outside, a pin being connected to the smaller membrane and being adapted to extend into the path of movement of the valve disc to engage the disc and maintain it in the open position when substantially equal pressure is maintained in the upstream and downstream sides of the valve seat, means sensitive to the rate of flow disposed in the path of the fluid stream and fixedly attached to said cock, a predetermined balance weight rigidly connected to said cock, said last-mentioned means and said balance weight cooperating to maintain said cock in a position to provide communication between said by-pass and said downstream when the rate of flow of said fluid stream is at a predetermined rate, said last-mentioned means and said balance weight further cooperating to cause said cock to move to another position and close the communication between said by-pass and said downstream and to interconnect the space above the larger membrane and the atmosphere when the rate of flow varies from said predetermined rate.

5. A valve as claimed in claim 4, wherein a narrow channel is provided in the stem adapted to bridge said gasket during part of the opening movement of the valve.

6. A valve comprising a valve disc closing onto a valve seat in the direction of the fluid flow, two superposed membranes of different areas being enclosed in a housing mounted on the valve, the smaller membrane being in communication with the fluid pressure at the entrance (i.e. upstream) of the valve seat at all times, while the larger membrane is in communication with the fluid pressure at the exit (i.e. downstream) of the valve seat by means of a by-pass and a three-way cock in said downstream side, means being provided on the valve stem to remove the disc from its seat against the force of a spring, and means being provided on the membrane extending into the path of movement of the valve disc to engage the disc and maintain it in the open position against the action of said spring force as long as the pressure in the upstream and downstream sides of the valve seat is substantially equal, said three-way cock being lodged in an enlarged part of the wall beyond the valve seat, said cock including an arm extending to the atmosphere and being provided with an adjustable balance weight, the cock having a transverse bore adapted to provide communication between the by-pass and the downstream side in one position of the cock, and radial bores connected by an axial bore providing communication between said by-pass and the atmosphere in another position of the cock, a sensing rod provided with a spherical body extending perpendicular to and being fixedly connected to the said three-way cock, the said body facing the fluid flow, and when the rate of said flow exceeds the rate for which the balance weight had been adjusted, the force on the sensing rod and spherical body overcomes said balance weight whereby the cock rotates to a position in which communication is provided between the large membrane and the atmosphere.

7. A valve comprising a valve disc closing onto a valve seat in the direction of the fluid flow, two superposed membranes of different areas being enclosed in a housing mounted on the valve, the smaller membrane being in communication with the fluid pressure at the entrance (i.e. upstream) of the valve seat at all times, while the larger membrane is in communication with the fluid pressure at the exit (i.e. downstream) of the valve seat by means of a by-pass and a three-way cock in said downstream side, manually operable means being provided on the valve stem to remove the disc from its seat against the force of a spring, and means being provided on the membranes extending into the path of movement of the valve disc to engage the disc and maintain it in the open position while the pressure in the upstream and downstream sides of the valve seat is substantially equal, further means being provided to reduce the pressure on the larger membrane after a predetermined time lapse, said last-mentioned means comprising a bore in the wall of the downstream side, which bore is in communication on the one hand with said by-pass through said three-way cock, and on the other hand with a chamber communicating with the atmosphere, which communication is adapted to be interrupted by a closure operable by a screw connected to a timing mechanism, a plunger of slightly smaller diameter than said bore being loosely movable within said bore and having a head of larger diameter than the bore extending into the downstream side of the valve, a spring being provided to keep said head from covering said bore when communication between said bore and the atmosphere is closed, so that fluid pressure in said chamber equals the fluid pressure inside the valve, said head being adapted to cover said bore when the plunger moves toward the said chamber, the plunger being adapted to be moved toward said chamber when communication is established between the chamber and the atmosphere, so that the internal pressure of the valve is greater than the pressure in said chamber and the force on said plunger is greater than the force of said spring, said communication between said chamber and said atmosphere causing thereby a decrease of pressure on said larger membrane.

References Cited by the Examiner

UNITED STATES PATENTS

| 1,466,412 | 8/23 | Samain | 137—505.23 X |
|---|---|---|---|
| 2,068,177 | 1/37 | Henion | 137—624.12 X |
| 2,485,504 | 10/49 | Morgan | 251—324 |
| 2,694,408 | 11/54 | McRae | 137—463 XR |
| 2,780,213 | 2/57 | Colling et al. | 251—324 XR |
| 2,927,603 | 3/60 | Willis | 251—73 X |

FOREIGN PATENTS

| 1,263,250 | 5/61 | France. |
|---|---|---|
| 499,725 | 5/30 | Germany. |

ISADOR WEIL, *Primary Examiner.*

M. CARY NELSON, WILLIAM F. O'DEA,
*Examiners.*